US005449284A

United States Patent [19]

Spina

[11] Patent Number: 5,449,284
[45] Date of Patent: Sep. 12, 1995

[54] COMPRESSION MOLDING AND TRIMMING BLOW PIN ASSEMBLY

[75] Inventor: Dennis R. Spina, Onsted, Mich.
[73] Assignee: Hoover Universal, Inc., Plymouth, Mich.

[21] Appl. No.: 202,267
[22] Filed: Feb. 25, 1994
[51] Int. Cl.[6] .................... B29C 49/04; B29C 49/08; B29C 49/30; B29C 49/50
[52] U.S. Cl. .................... 425/525; 264/533; 264/540; 425/527; 425/531; 425/535; 425/541
[58] Field of Search .................... 264/533, 540; 425/525, 425/531, 535, 532, 541, 527

[56] References Cited

U.S. PATENT DOCUMENTS 3,209,401 10/1965 Mehnert .................... 425/525
4,753,591 6/1988 Maes et al. .................... 264/533 X
4,954,071 9/1990 Austin .................... 425/531

*Primary Examiner*—Karen Aftergut
*Attorney, Agent, or Firm*—Harness, Dickey & Pierce

[57] ABSTRACT

A method and apparatus for producing a hollow article having a blow molded portion and a compression molded portion. Plastic is extruded over a blow pin assembly to form a parison having an open end and a diameter larger than the diameter of the article's mouth. The blow pin is movable relative to the parison and includes a male mold member on its end. The male mold member has a molding surface corresponding in shape to the compression molded portion of the article. A cutting member is also provided on the blow pin. The cutting member is also movable relative to said parison. Once the parison is enclosed in a hollow mold, the male mold member of the blow pin compresses a portion of the parison between the second portion of the hollow mold and the molding surfaces of the male mold member so as to form the compression molded portion of the article. The cutting member is then moved downwardly relative to the parison so as to sever the parison at a position generally within the second portion of the mold and above the compression molded portion of the article. Air is then admitted through the blow pin into the interior of the parison to blow mold the blow molded portion of the article.

13 Claims, 2 Drawing Sheets

COMPRESSION MOLDING AND TRIMMING BLOW PIN ASSEMBLY

BACKGROUND AND SUMMARY OF THE INVENTION

This invention generally relates to a method and apparatus for molding plastic articles. More specifically, the invention relates to a method and apparatus for forming one-piece hollow plastic articles having a blow molded portion and a compression molded portion.

When forming blow molded hollow plastic articles, it is common to extrude a tubular parison from an extrusion head at an elevated molding temperature and in a semi-soft or molten condition. The parison is typically extruded downwardly in the path of a closable blow mold. The mold is usually constructed from a pair of mold halves having inner surfaces that define a mold cavity conforming to the desired configuration of the article. The mold halves close around the parison to clamp it within the molding cavity such that one end is pinched or closed off thereby sealing that end. The other end is closed within the mold halves to form an access opening. With the parison clamped between the mold halves, a blow pin assembly, over which the parison has been extruded, emits air into the interior of the parison which inflates or expands the parison against the molding surfaces of the mold cavity. Heat is conducted by the mold away from the expanded parison causing the plastic to form a solid molded object. The mold halves are then separated and the article removed.

Many blow molded containers are produced having a reduced diameter neck which is molded around the blow pin assembly and held by the mold while the parison body is blown into its final configuration. However, in blow molding containers having relatively wide mouths or access openings, various manufacturing problems can be, and often are, encountered. For example, if a relatively large diameter parison is selected to mold a container having a wide mouth, relatively little radial expansion of the parison is accomplished and folds or imperfect definitions can be obtained on the outer surface of the molded article. Also, a large tear line often forms across the closed end of the container where the parison has been pinched-off. Alternatively, if a small diameter parison is used for a container having a relatively wide access opening, the parison cannot mold itself to the wide mouth access opening without leaving at least a partially annular cap at the opening. This partial cap requires an additional production step to machine the final opening.

When blow molding containers having relatively wide mouths from parisons having relatively small diameters, the molding machine often includes an articulating mechanism that engages and radially stretches the parison, in the mouth area, to conform it with the wide mouth as defined by the mold.

Often it is desirable to form a container having an integral funnel associated with its mouth. When blow molding such a container, additional problems are encountered. Typically the funnel portion of the container is joined to the reservoir or body portion of the container by a relatively narrow neck. As a result, when both the funnel and body of the container are blow molded, considerable flash remains on the molded product in the area of the neck requiring additional trimming or machining operations.

In overcoming some of the problems associated with forming plastic articles of this type, methods which compression mold the funnel while blow molding the remaining portions have been developed. In these molding processes, the mold includes a compression molding surface and a blow molding surface. When the parison is clamped within the mold, a male mold member, having a molding surface corresponding to the compression molding surface, is advanced along the blow pin to compression mold that portion of the container. The remainder or body of the container is then blow molded.

Unfortunately, the prior compression/blow molding apparatuses and procedures are complex and typically require an articulating member which grasps the end of the parison, stretches it over the male mold member. Additionally, the molded article requires additional processing steps to remove excess flash and other material from the molded container.

With the above limitations in mind, it is an object of the present invention to provide an apparatus for molding a hollow plastic article having a compression molded portion and a blow molded portion.

A further object of this invention is to provide a method for molding a hollow plastic article having a compression molded portion and a blow molded portion.

A related object of this invention is to provide an apparatus and method in which the molded article is compression molded, blow molded and trimmed all in a single step of the molding operation.

Another object of this invention is to produce an article having integral funnel connected by a narrower neck to a relatively wide body.

Still another object of this invention is to provide an apparatus and method for producing an article in which an integral funnel portion is formed by compression molding and while the body portion of the article is formed by blow molding.

In accomplishing the above objects, the present invention provides both an apparatus and method for producing a hollow plastic article having both a blow molded portion and a compression molded portion. The article includes a relatively wide body, a narrower neck, and a relatively wide funnel-shaped mouth. In forming the article, a plastic parison, having a downwardly facing open end and a diameter which is larger than the diameter of the funnel, is downwardly extruded from an extrusion head. The parison is extruded from the extrusion head and then enclosed within the mold whose mold cavity includes surfaces defining a blow molded portion and a compression molded portion of the article. Once the parison has been clamped within the mold, a blow pin is moved into position for blow molding and a male mold member, associated with the blow pin, is moved to cause its molding surface, which corresponds to the compression molding surface of the mold, to engage the parison thereby compression molding the funnel portion of the container. Air is admitted through the blow pin expanding the remainder of the parison into conformity with the blow molding surfaces of the mold. A cutting member is then moved relative to the mold until its cutting edge severs the parison at a position immediately adjacent to the compression molded funnel. The finished article is then removed from the mold.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
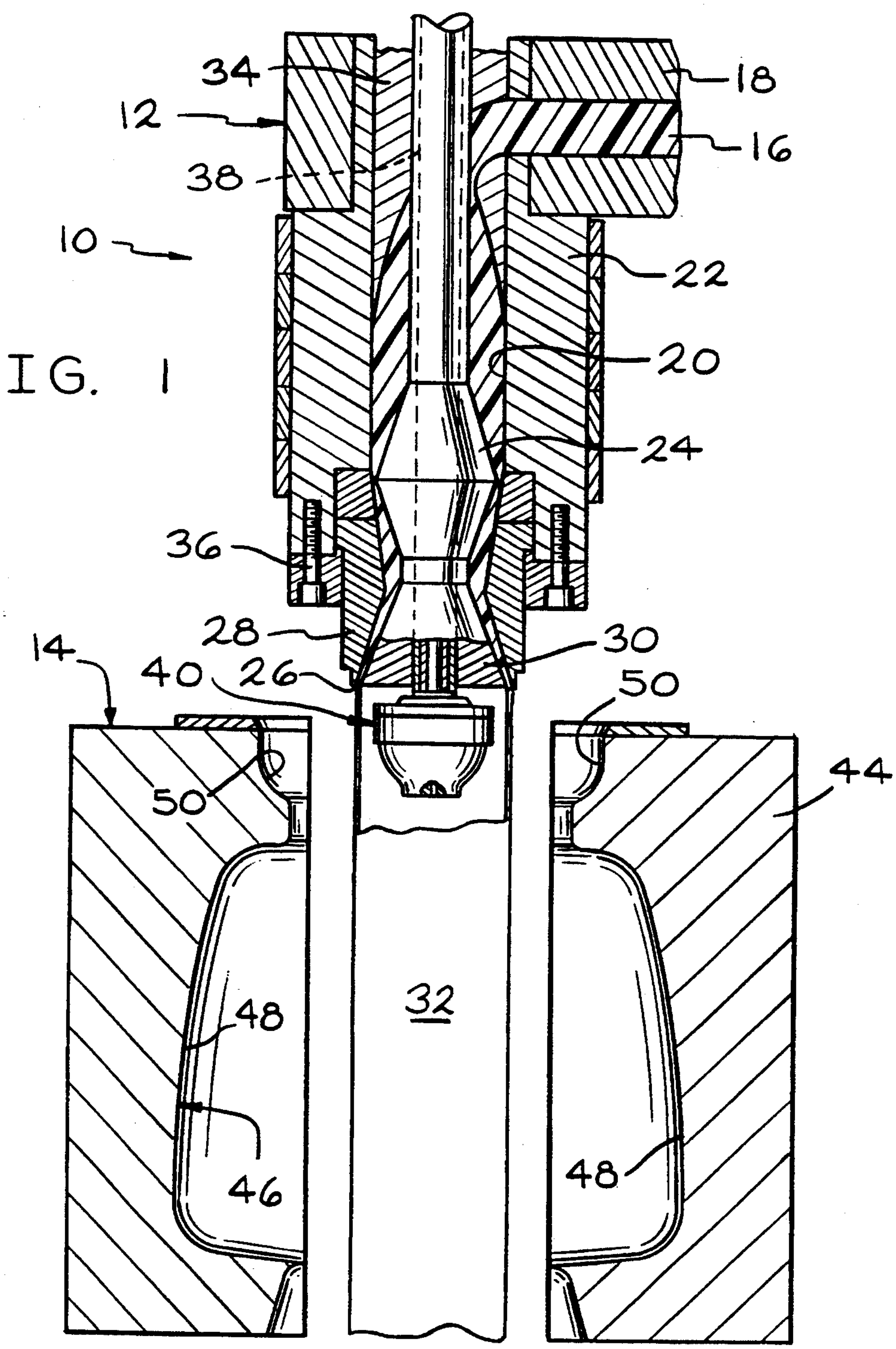
FIG. 1 is a sectional view generally illustrating one embodiment of an apparatus capable of performing the method of the present invention.
Figure 2:
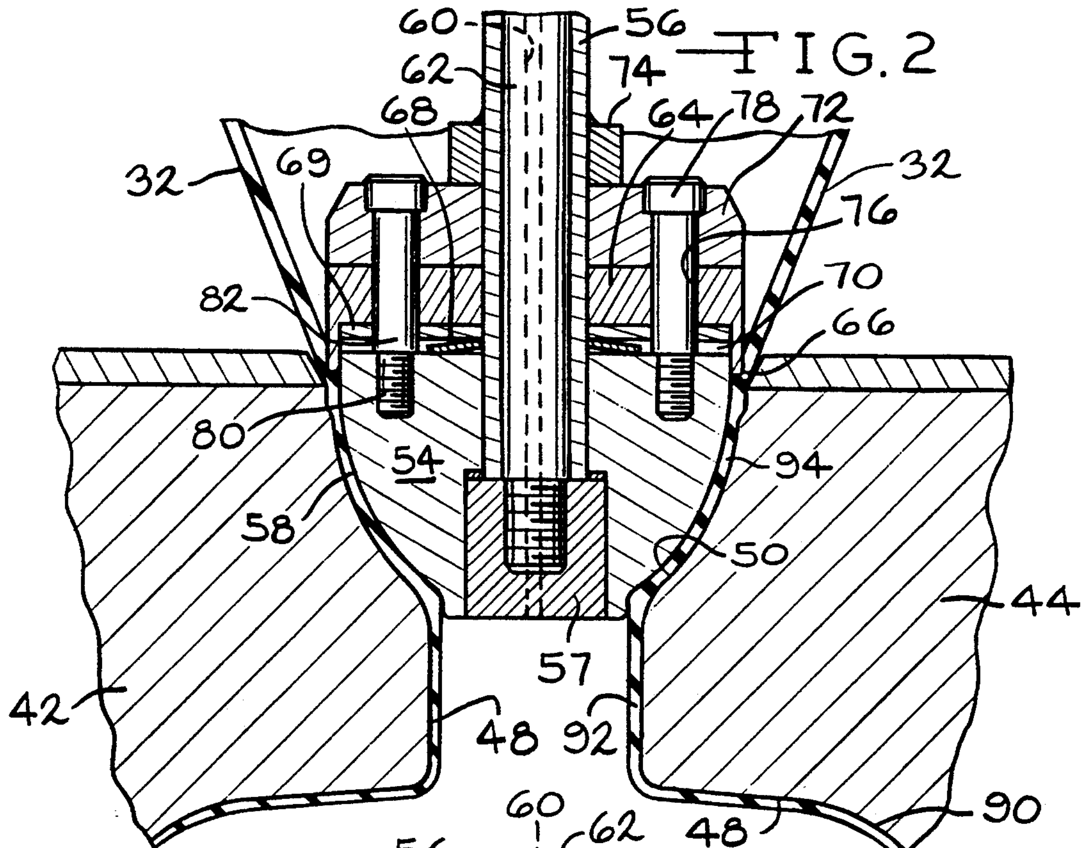
FIG. 2 is an enlarged sectional view of the blow pin assembly illustrated in FIG. 1 during compression molding.

Referring now to the drawings, an apparatus capable of forming a hollow article having a compression molded portion and a blow molded portion is generally illustrated in FIG. 1 and designated at 10. The apparatus 10 principally includes an extruder head 12 and a mold 14.

Thermal plastic resin 16 is extruded by a primary extruder (not shown). The extruder may be of one of the well known varieties commonly used in the industry such as a single or double screw extruder. For this reason, the extruder is not more fully shown or described. The pressure and temperature in the extruder causes molten resin 16 to be forced through an inlet conduit 18 into a generally annular cavity 20 defined in the extruder head 12. The cavity 20 is defined in the extruder head 12 between the die body 22 which is radially spaced around a mandrel sleeve 24. The cavity 20 terminates at its lower end in an annular outlet orifice 26 defined between a die head 28 and a mandrel head 30. As the molten resin 16 flows into the cavity 20, it is directed downward by a diverter 34 positioned at the upper end of the extruder head 12 between the mandrel sleeve 24 and the die body 22. The resin 16 flows downwardly through a series of thickness variations which condition the resin for extruding and molding. Upon reaching the die head 28, mounted to the lower end of the die body 22, the resin 16 passes between the die head 28 and mandrel head 30 and is emitted out of the annular orifice 26 as a substantially cylindrical parison 32. As seen in FIG. 1, the die head 28 is rigidly mounted to the die body 22 by a fastener 36 such as a threaded screw.

The mandrel sleeve 24 has an axial bore 38 defined centrally through it. A blow pin assembly 40 extends through the bore 38. As will be further discussed below, the blow pin assembly 40 is mounted so that it can be vertically movable relative to the extrusion head 12 and the mold 14. While the blow pin 40 is illustrated as having the parison 32 extruded over or about it, such as occurs in a reciprocal extrusion process, it should be understood that the features and principles of the present invention could also be utilized in a continuous extrusion process where the parison 32 is clamped within the mold 14 and shuttled to a remote blowing station containing the blow pin 40.

The mold 14 is comprised of two mold halves 42 and 44 which clamp around and enclose the parison 32 within a mold cavity 46 having a shape corresponding to the final configuration of the article being formed. As described herein, the particular article is a water bottle. However, the invention is not intended to be so limited and could be used to form numerous other articles.

The mold cavity 46 includes a first portion defining a blow molding surface 48 which corresponds to the wide body 90 of the water bottle. A second portion of the mold cavity 46 includes a second or compression molding surface 50 which corresponds to the narrower neck 92 and funnel-shaped mouth 94 of the water bottle. Mounted to the top of the mold 14 and generally encircling the opening defined by the molding surface of the second portion 50 is a reinforcement or cutting plate 52.

As seen in FIG. 1, the parison 32 is extruded over the blow pin assembly 40 as a substantially cylindrical hollow tube. It will be noted that the diameter of the parison 32 is larger than the diameter of both the neck 92 and funnel-shaped mouth 94 of the water bottle being formed. During formation of the water bottle, the parison 32 is clamped between the mold halves 42 and 44 and the lower end of the parison 32 is pinched off and sealed as a result of the closing of the mold 14.

Located on the lower end of the blow pin assembly 40 is a male mold member 54. The male mold member 54 is supported on and movable relative to an outer stem 56 of the blow pin assembly 40 which extends through the die body 22 and a central bore in the male mold member 54. It is retained on the outer stem 56 by a nut 57 which is threadably engaged on the lower end of an inner stem 62 positioned radially within the outer stem 56. The male mold member 54 includes a compression molding surface 58 that corresponds in shape to the compression molding surface 50 of the mold 14.

While not shown in the figures, a generally annular insert may be carried by the inner stem 62 of the blow pin assembly 40, vertically beneath the male mold member 54, for incorporation into the container. During molding, the insert cooperates with the blow pin assembly 40 to compression mold the neck 92 of the container. As a result of the molding process, the insert is molded into the neck 92 and separated from the inner stem 62 providing the neck 92 with an internally threaded bore that will receive and withstand the mechanical loads applied by a closure cap engaged with the water bottle. Alternatively, the insert may be omitted and the neck 92 formed by blow molding with the body 90.

During molding, the male mold member 54 and the insert, if provided, are clamped between the mold halves 42 and 44 to compress and forcing that portion of the parison into contact with the compression molding surface 50 of the mold 14. Once the male mold member 54 engages the parison 32 sufficiently to for an air tight seal in the area of the mouth 94, air is admitted through a central airway 60 in the inner stem 62 of the blow pin assembly 40. The air inflates the parison 32 causing it to conform to the blow molding surfaces 48 of the mold cavity 46 which define the body 90 of the water bottle. Once the body 90 has been formed, or simultaneously therewith, the outer stem 56 is moved downwardly causing the male mold member 54 to further compress and mold the resin 16 located between the compression molding surfaces 50 and 58, respectively of the mold 14 and the male mold member 54.

As the male mold member 54 is moved downwardly during compression molding of the water bottle's mouth 94, a cutter 64, also mounted on the outer stem 56 and movable therewith, forces a cutting surface 66 to engage the parison 32 in the area adjacent mouth 94 thereby severing and performing final trimming of the resin 16 around the mouth 94 of the water bottle.

Figure 3:
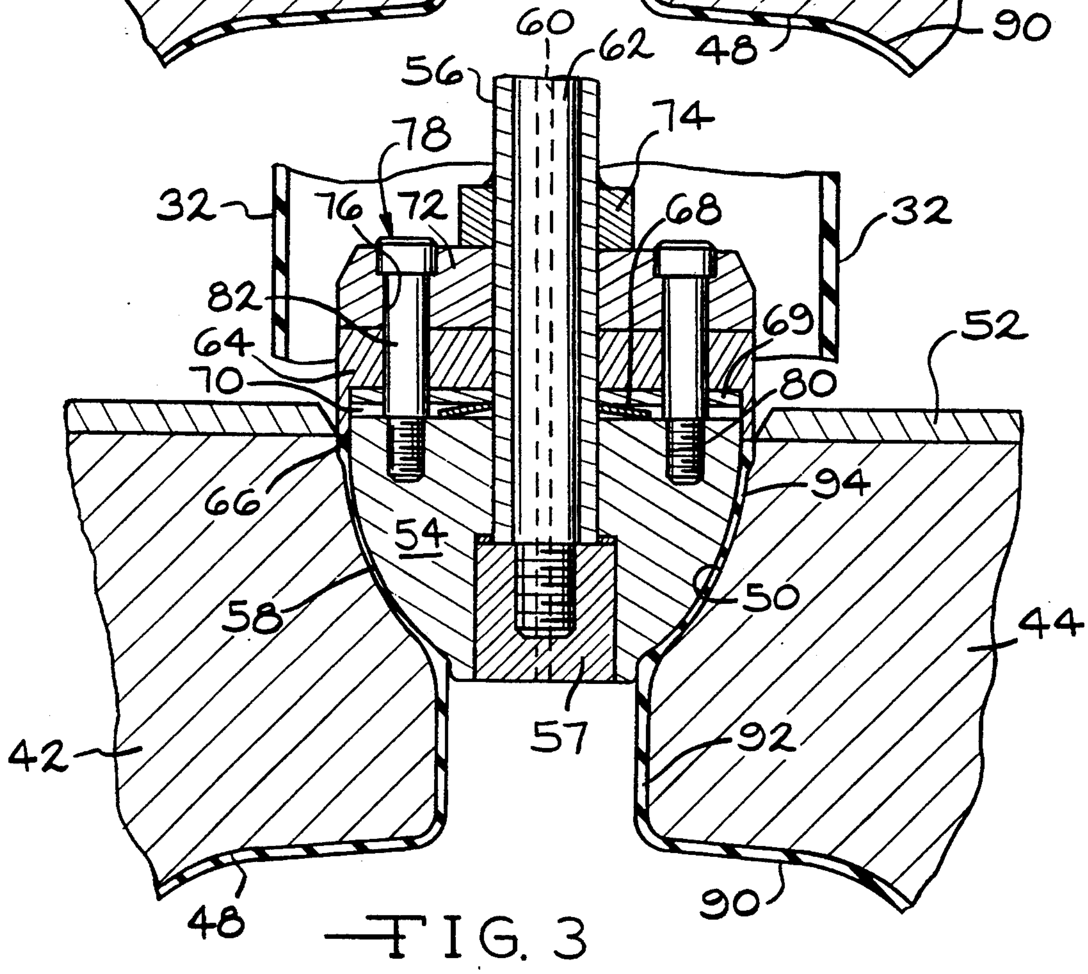
FIG. 3 is an enlarged sectional view, similar to that seen in FIG. 2, illustrating the molded article being trimmed by the present invention.

The cutter 64 is mounted to the male mold member 54 so that a limited amount of axial movement is permitted between the two. As seen in FIG. 3, a bellville washer or other biasing means 68 is positioned around the outer stem 56 and located in a receiving space 70 defined between the cutter 64 and the male mold member 54. Also located in the receiving space 70 is a bearing plate 69 that provides a wear surface on the cutter 64. The bearing plate 69 might be omitted and replaced with another bellville washer if a greater amount of biasing is desired. Upward axial movement of the cutter 64 is limited by a backing plate 72 positioned above the cutter 64 whose axial movement is in turn prevented by a stop 74 welded or otherwise secured to the outer stem 56. A pair of bores 76 are defined through both the backing plate 72 and the cutter 64 to enable fasteners 78 to be extended therethrough. The fastener 78 is adapted on one end to engage a threaded bore 80 defined in the male mold member 54. The shank 82 of the fastener 78 has a diameter which is greater than that of the bore 80 thereby limiting how far the cutter 64 can be tightened down onto the male mold member 54 against the bias of the washer 68. Since the shank 82 is cylindrical and not threaded where it extends through the cutter 64, the male mold member 54 can be biased against the force of the bellville washer 68 and moved generally toward the cutter 64 since upward movement of the cutter 64 is prevented by the stop 74. This limited axial play between the male mold member 54 and the cutter 64 allows the blow pin assembly 40 to compensate for thickness variations in the parison during compression molding of the funnel shaped mouth 94 while still ensuring that the cutting surface 66 will be downwardly advanced far enough to completely and cleanly sever the parison 32 around the mouth 94. This, however, only occurs when the thickness of the parison 32 is great enough to limit compression molding thereby causing the rearward biasing of the male mold member 54.

As seen from the above discussion, the apparatus 10 and method of the present invention are capable of forming an article in which the blow molding step, the compression molding step, and a trimming step are all combined into a single operation. The net effect of the invention is therefore a decreased cycle time for the formation of the article and a cost savings realized by the manufacturer.

While the above description constitutes the preferred embodiment of the present invention, it will be appreciated that the invention is susceptible to modification, variation and change without departing from the proper scope and fair meaning of the accompanying claims.

What is claimed is:

1. An apparatus for molding a hollow plastic article having a blow molded portion and a compression molded portion, said hollow article further having a relatively wide body, a narrow neck and a generally funnel-shaped relatively wide mouth, said apparatus comprising:

extrusion means for extruding plastic to form a parison having an open end;

a mold having a pair of mold halves, said mold including portions defining a mold cavity, said mold cavity including a first portion having a molding surface corresponding to the blow molded portion of the hollow article and including a second portion having a molding surface corresponding to said compression molded portion of said hollow article;

clamping means for generally enclosing said parison within said mold cavity;

a blow pin having a passageway therethrough;

a male mold member movably mounted with respect to said blow pin, portions of said male mold member defining a compression molding surface thereon, said compression molding surface of said male mold member having a shape corresponding to said second portion of said mold;

a cutter mounted to said blow pin and having a cutting surface, said cutter being movable relative to said male mold member;

air supply means for supplying air into an interior of said parison through said blow pin and while said parison is enclosed within said mold cavity, said air inflating said parison to form the wide body of the hollow article by blow molding;

moving means for moving said male mold member relative to said blow pin and said second portion of said mold so as to form the wide mouth of the hollow article by compression molding between said second portion of said mold and said compression molding surface of said male mold member; and moving means for moving said cutter relative to said mold and said male mold member, said cutter being engagable with said parison so as to sever said parison at a position generally within said second portion of said mold and above said wide mouth of the hollow article.

2. An apparatus as set forth in claim 1 wherein said parison is extruded downwardly from said extrusion means.

3. An apparatus as set forth in claim 2 wherein said parison is extruded with a downwardly facing open end.

4. An apparatus as set forth in claim 2 wherein said blow pin extends through said extrusion means and is movable relative thereto.

5. An apparatus as set forth in claim 2 wherein said male mold member is supported by a stem, said stem being movable relative to said blow pin.

6. An apparatus as set forth in claim 5 wherein said male member is mounted to said stem so as to permit a limited amount of movement of said male mold member with respect to said stem.

7. An apparatus as set forth in claim 5 wherein said cutter is supported by said stem.

8. An apparatus as set forth in claim 7 wherein said cutter and said male mold member are mounted to said stem so as to permit relative movement therebetween.

9. An apparatus as set forth in claim 7 wherein said cutter is substantially immovable relative to said stem.

10. An apparatus for molding a hollow plastic article having a blow molded portion and a compression molded portion, said hollow article further having a relatively wide body, a narrow neck and a generally funnel-shaped relatively wide mouth, said apparatus comprising:

extrusion means for extruding plastic to form a parison having an open end;

a mold having a pair of mold halves, said mold including portions defining a mold cavity, said mold cavity including a first portion having a molding surface corresponding to the blow molded portion of the hollow article and including a second portion having a molding surface corresponding to said compression molded portion of said hollow article;

clamping means for generally enclosing said parison within said mold cavity;

a blow pin having a passageway therethrough;

a male mold member mounted to said blow pin, portions of said male mold member defining a compression molding surface thereon, said compression molding surface of said male mold member having a shape corresponding to said second portion of said mold;

a cutter mounted to said blow pin, said cutter having a cutting surface and being movable relative to said male mold member;

biasing means for biasing said male mold member relative to said cutter;

air supply means for supplying air into an interior of said parison through said blow pin and while said parison is enclosed within said mold cavity, said air inflating said parison to form the wide body of the hollow article by blow molding;

moving means for moving said male mold member relative to said second portion of said mold so as to form the wide mouth of the hollow article by compression molding between said second portion of said mold and said compression molding surface of said male mold member; and moving means for moving said cutter relative to said mold, said cutter being engagable with said parison so as to sever said parison at a position generally within said second portion of said mold and above said wide mouth of the hollow article.

11. An apparatus as set forth in claim 10 wherein said biasing means biases said male mold member in a direction away from said cutter.

12. An apparatus as set forth in claim 10 wherein said biasing means is a spring located between said male mold member and said cutter, said spring permitting a limited amount of movement of said male mold member toward said cutter.

13. An apparatus for molding a hollow plastic article having a blow molded portion and a compression molded portion, said hollow article further having a relatively wide body, a narrower neck and a generally funnel-shaped relatively wide mouth, said apparatus comprising:

extrusion means for extruding a plastic parison, said parison being downwardly extruded and having a downwardly facing open end;

a hollow mold including a pair of mold halves adapted to enclose said parison therein, said mold including an interior surface defining a molding cavity, said surface having a first portion defining a blow molding surface corresponding in shape to said blow molded portion of said hollow article, said surface also having a second portion defining a compression molding surface corresponding in shape to said compression molded portion of said hollow article;

a blow pin having a passageway defined therethrough for providing a blowing medium into an interior of said parison when said parison is enclosed within said mold thereby inflating a portion of said parison to form said wide body of said hollow article by blow molding;

a male mold member having a molding surface corresponding in shape to said compression molding surface, said male mold member being supported by a stem and being movable relative to said blow pin;

a cutter including portions defining a cutting edge, said cutter being mounted to said stem and being movable relative to said blow pin, said cutter further adapted for relative movement with said male mold member;

biasing means for biasing said cutter and said male mold member apart from one another;

air supply means for supplying air through said passageway of said blow pin;

means for moving said male mold member to compress said parison between said second portion of said hollow mold and said molding surface of said male mold member to form said wide mouth of said hollow article by compression molding; and means for moving said cutter relative to said mold so as to engage said cutting edge with said parison and sever said parison at a position generally within said second portion of said hollow mold and above said wide mouth of said hollow article.

* * * * *